May 15, 1962     T. J. TUPPER     3,034,819
SEALING DEVICE
Filed March 14, 1960

INVENTOR.
Thomas J. Tupper
BY
*Hovey, Schmidt, Johnson & Hovey*
ATTORNEYS.

United States Patent Office 3,034,819
Patented May 15, 1962

---

3,034,819
SEALING DEVICE
Thomas J. Tupper, 7306 W. 72nd,
Overland Park, Kans.
Filed Mar. 14, 1960, Ser. No. 14,935
1 Claim. (Cl. 292—307)

This invention relates to sealing devices to be used with property to be protected against undiscovered tampering.

It is the most important object of this invention to provide a sealing device which can be quickly and conveniently affixed to property to be protected in bridging relationship to shiftable parts of the latter, such as a closure and frame, and which will be mutilated to indicate the occurrence of tampering whenever either parts are relatively shifted or effort is made to remove and subsequently replace the sealing device.

Another object of the invention is to provide an inexpensive sealing device in the nature of a paper strip having adhesive material on the rear face thereof and provided with a plurality of lines of weakness therein along which the device will be irreparably divided when an attempt is made to remove the same from a surface to which it has been adhesively attached.

It will be noted that the sealing devices contemplated by the invention operate as a psychological deterrent to tampering with the property protected, rather than attempting to serve as a break-proof seal relying upon physical strength and locking action. The devices are also particularly effective in establishing the absence of tampering while the property is in the custody of persons who might falsely be accused of tampering, such as police department or checkstand employees.

Other objects of the invention will be apparent from the description of a currently preferred embodiment which follows:

Figure 2:
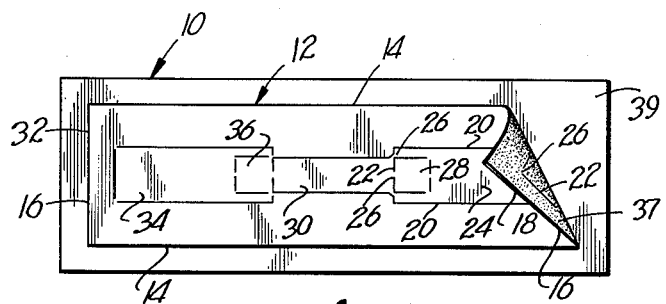
FIG. 2 is a perspective view of the sealing device per se.

The sealing device which is the subject of this invention is broadly denoted by the numeral 10 and is comprised of a polygonal member 12 of a material capable of being relatively easily torn, as for example, preferably paper. Member 12 is provided with a pair of longitudinal edges 14 and a pair of transverse edges 16 as best shown in FIG. 2.

Member 12 is provided with a plurality of lines of weakness therein produced preferably by scoring or cutting, a number of said lines being longitudinally disposed therein parallel to longitudinal edges 14 and the remaining lines being transverse to member 12 and substantially parallel to transverse edges 16. At end 18 of member 12, longitudinal lines 20 and transverse lines 22 outline a central end portion 24 as best seen in FIG. 2. It is to be noted that a small section 26 of member 12 separates the longitudinal lines from the corresponding transverse line proximal to end 18 and also separates the parts of transverse line 22 proximal to the center of member 12. Longitudinal and transverse lines formed in member 12, also outline inner portion 28 and mid-portion 30, and the lines are also separated by a short section 26 of the material of member 12. In the sealing device herein described, the lines are formed so as to provide a preferably symmetrical pattern on member 12 to thereby form portions 34 and 36 on end 32 of member 12.

A pressure sensitive adhesive of the type commonly used on labeling is placed on the normally rear face 37 of member 12 so that the latter may be applied to an object to be secured. Member 12, prior to use, is affixed to a paper backing 39 to facilitate storage. Removal of the member 12 from backing 39 does not mutilate in any way the character of member 12, and the member 12 can be transferred intact to an object to be protected.

Figure 1:
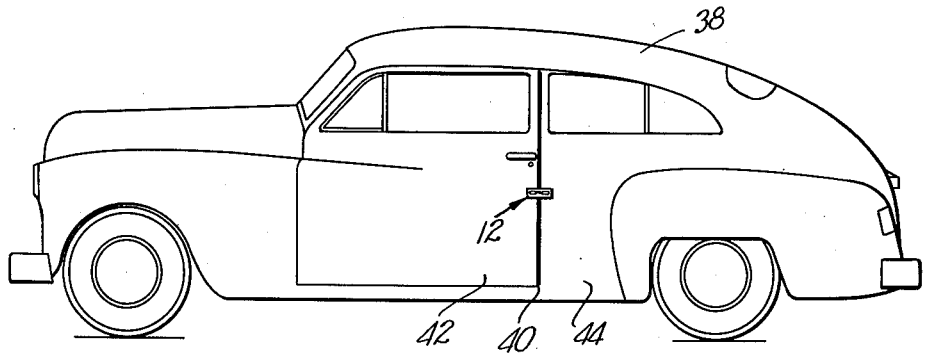
FIG. 1 is a side elevational view of an automobile to which is affixed a sealing device as contemplated by this invention.

In an illustrative use, member 10 is applied to an automobile 38 at the separation zone 40 between door 42 and body panel 44, as seen in FIG. 1. In such a use, it may be conceivable that the automobile may be in the custody of a party other than the true owner, such as the police department of a municipality, having possession of the automobile after having towed the latter from a location of illegal parking. Member 12 may be affixed to the automobile to act as a psychological deterrent to tampering while the automobile is in such a custody, for it is evident that to open door 42 of automobile 38, member 12 is torn along a line spanning the distance between longitudinal edges 14 proximal to zone 40. Furthermore, it is evident that an attempt to remove member 12 from automobile 38 will, in all likelihood, mutilate member 12 by tearing the latter.

Figure 3:
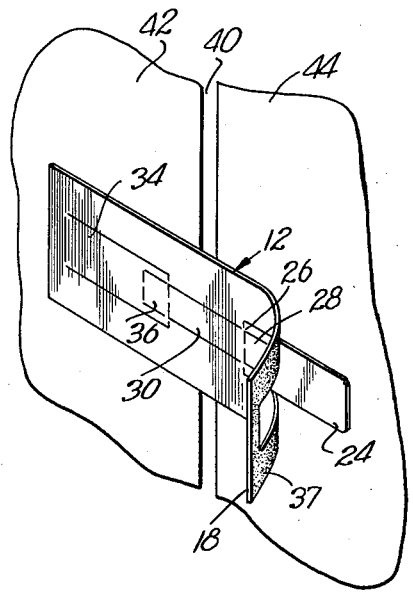
FIG. 3 is an enlarged, fragmentary, perspective view of the sealing device affixed to relatively shiftable parts of an article of property to be protected thereby, illustrating the effect of an attempt to remove the device from the article.

When end 18 is peeled back from body panel 44, as seen in FIG. 3, central end portion 24 remains affixed to panel 44 since the adhesive force tending to hold end portion 24 to the automobile is great enough to overcome the tendency to pull away therefrom. In addition, sections 26 are torn so that longitudinal lines 20 merge with transverse line 22 to separate central end portion 24 from the marginal edges of member 12, and the scored lines are opened. Since member 12 is of a material relatively easily torn, the same may be torn at end 18 thereof when the peeling action is initiated. To peel central end portion 24 from body panel 44, causes in like manner the separation of the latter from inner portion 28, for, as in the last case, sections 26 are torn, score lines are opened, and the longitudinal and transverse lines merge to separate end portion 24 from inner portion 28. Peeling inner portion 28 away from body panel 44, causes it to completely separate from mid-portion 30.

It is to be noted that an attempt to replace inner portion 28, central end portion 24 or the marginal edge portion surrounding central end portion 24, is to no avail, due to the nature of the adhesive and the fact that the edges of the portions immediately show the mutilation that ensues when the latter are torn and separated from adjoining portions of member 12.

Having thus described the invention what is claimed as new and desired to be secured by Letters Patent is:

A sealing device for adhesive attachment across relatively shiftable parts of property to be protected, said device comprising a generally rectangular, flat sheet member of material capable of being relatively easily torn and having a normally rear face adapted to be affixed to said parts so that the entire face engages the latter, said member having a pair of spaced, parallel, longitudinal edges and a pair of spaced, parallel, transverse edges; pressure-sensitive adhesive covering said rear face, there being two pairs of spaced, first longitudinal lines of weakness in the member spaced inwardly from the longitudinal edges thereof and two pairs of spaced, first transverse lines of weakness spaced inwardly from the transverse edges of the member intersecting respective first longitudinal lines of weakness to define a pair of spaced end portions of the member, one of said end portions being disposed proximal each end of the member, a pair of spaced, parallel, second longitudinal lines of weakness extending between the end portions to define a mid-portion therebetween, said mid-portion being narrower than the end portions, a pair of parallel, spaced, third longitudinal lines of weakness in each end portion, said third longitudinal lines being continuations of said second longitudinal lines, and a second transverse line of weakness for each portion, said second transverse line intersecting the third pair of longitudinal lines in each section in spaced relationship to said first transverse lines to define a pair of inner portions of the member, each inner portion being completely bounded by lines of weakness and wholly within the respective end portions whereby, when said face is adhesively engaging said parts and an attempt is made to remove the latter from one of said parts, or to shift said parts, said lines permit the portions to become irreparably separated from the remainder of said member to indicate such attempt.

References Cited in the file of this patent

UNITED STATES PATENTS

| | | |
|---|---|---|
| 2,013,299 | Byrne | Sept. 3, 1935 |
| 2,845,728 | Huber | Aug. 5, 1958 |
| 2,859,907 | McFarland | Nov. 11, 1958 |

FOREIGN PATENTS

| | | |
|---|---|---|
| 555,817 | France | Mar. 31, 1923 |